United States Patent [19]
Gill et al.

[11] Patent Number: 5,696,654
[45] Date of Patent: Dec. 9, 1997

[54] DUAL ELEMENT MAGNETORESISTIVE SENSOR WITH ANTIPARALLEL MAGNETIZATION DIRECTIONS FOR MAGNETIC STATE STABILITY

[75] Inventors: Hardayal Singh Gill, Portola Valley; Mustafa Pinarbasi, Morgan Hill, both of Calif.

[73] Assignee: International Business Machines Corporation, Armonk, N.Y.

[21] Appl. No.: 660,570

[22] Filed: Jun. 7, 1996

Related U.S. Application Data

[63] Continuation-in-part of Ser. No. 558,909, Nov. 8, 1995, abandoned, which is a continuation of Ser. No. 230,674, Apr. 21, 1994, abandoned.

[51] Int. Cl.⁶ ................................ G11B 5/127
[52] U.S. Cl. ................................ 360/113
[58] Field of Search ........................ 360/113

[56] References Cited

U.S. PATENT DOCUMENTS

| | | | |
|---|---|---|---|
| 4,103,315 | 7/1978 | Hempstead et al. | 360/113 |
| 4,987,509 | 1/1991 | Gill et al. | 360/113 |
| 5,032,945 | 7/1991 | Argyle et al. | 360/126 |
| 5,079,035 | 1/1992 | Krounbi et al. | 427/130 |
| 5,084,794 | 1/1992 | Smith et al. | 360/113 |
| 5,309,305 | 5/1994 | Nepela et al. | 360/113 |
| 5,483,403 | 1/1996 | Voegeli | 360/113 |

FOREIGN PATENT DOCUMENTS

| | | | |
|---|---|---|---|
| 59-112421 | 6/1984 | Japan | 360/113 |

OTHER PUBLICATIONS

Carey, M.J. and Berkowitz, A. E., "Exchange anisotropy in coupled films of $Ni_{81}Fe_{19}$ with NiO and $Co_xNi_{1-x}O$," Appl. Phys. Lett. 60 (24), 15 Jun. 1992, pp. 3060–3062.

Primary Examiner—Robert S. Tupper
Assistant Examiner—David D. Davis
Attorney, Agent, or Firm—Leslie G. Murray; Paik Saber

[57] ABSTRACT

A dual element magnetoresistive (MR) sensor is disclosed comprising two MR elements separated by a high resistivity conductive spacer material. A layer of hard bias material, which abuts one of the MR elements at each of its track edges, has a magnetization times thickness value substantially matched to that of the one MR element to bias it in one longitudinal direction. An exchange bias layer biases the other MR element by exchange coupling in an opposite longitudinal direction to achieve magnetic stabilization between the MR elements. The exchange bias layer abuts the other MR element at each of its track edges and has a magnetization times thickness value substantially matched to that of the other MR element. Alternatively, the exchange bias layer extends from one track edge to an opposite track edge in continuous underlying or overlying contact with the other MR element.

14 Claims, 2 Drawing Sheets

DUAL ELEMENT MAGNETORESISTIVE SENSOR WITH ANTIPARALLEL MAGNETIZATION DIRECTIONS FOR MAGNETIC STATE STABILITY

This is a continuation-in-part of application Ser. No. 08/558,909 filed on Nov. 8, 1995, now abandoned, which is a continuation of application Ser. No. 08/230,674 filed on Apr. 21, 1994, now abandoned.

FIELD OF THE INVENTION

This invention relates to magnetoresistive (MR) sensors, and more particularly to a dual element MR sensor with magnetic state stability and improved manufacturability.

BACKGROUND OF THE INVENTION

The advantages of dual element MR sensors have been discussed extensively in U.S. Pat. Nos. 4,987,509 and 5,084,794.

U.S. Pat. No. 5,084,794 discloses an MR sensor comprising two substantially identical MR elements separated by an insulating spacer layer except for conductive end strips that electrically short the MR elements. The shorted MR elements split a current applied thereto into two equal currents that flow in the same direction through the elements. These equal currents provide bias and also constitute sense currents for detecting element resistance change. No sense current is shunted through the insulating spacer layer. Since the identical elements have the same resistance, no voltage difference will be generated if an electrical short should occur with the result that any short circuits between the MR elements will not interfere with detection of recorded signals. However, since this sensor is unshielded, the thickness of the gap between the MR elements is critical. The insulating layer must be relatively thick, and the conductive strip must contact only a small area of both elements. This renders the sensor unacceptable for narrow track width applications. Also, there is no teaching of how to stabilize the opposing magnetic fields generated by the currents applied via the leads to the MR elements, which fields tend to destabilize the magnetic state of the MR elements.

U.S. Pat. No. 4,987,509 discloses a shielded MR sensor comprising a pair of MR elements separated by thin dielectric material. Sense conductors contact the proximate one ends of the elements for transmitting externally generated sense currents thereto. A common conductor is disposed between and contacts the proximate opposite ends of the elements for electrically shorting these elements and providing a return path for the sense currents. The field from the common conductor is in the same direction as fields from the sense conductors to stabilize the magnetic state of the MR elements. However, this arrangement requires at least three connections (the two sense conductors and a common conductor) to achieve the stabilization. Moreover, inserting the common conductor between the MR elements complicates the fabrication process.

Other prior art of interest includes commonly assigned U.S. Pat. No. 5,079,035 which discloses an MR sensor with hard magnetic bias layers that provide contiguous junctions having electrical and magnetic continuity with opposite ends of a single MR element. Also, a paper entitled "Exchange Anisotropy In Coupled Films of $Ni_{81}Fe_{19}$ with NiO and $Co_xNi_{1-x}O$" published at p. 3060 et seq. of Appl. Phys. Lett60, 15 Jun. 1992, discusses the use of NiO for exchange coupling.

In a dual element MR sensor, it is important to ensure magnetic stability of the two MR elements in order to provide proper functioning of the head. Since the MR elements can switch among a plurality of magnetic states, fluctuations in amplitude and asymmetry can occur. There is a need to achieve magnetic stability in a dual element MR sensor with or without magnetic shields that (1) is suitable for narrow track width applications, (2) has an improved configuration which minimizes the possibility of electrical shorting at the air bearing surface and/or shorting between the MR elements that could degrade performance by increasing sensitivity to common mode noise and provides abutting junctions for track edge definition, and (3) simplifies manufacturability.

SUMMARY OF THE INVENTION

A dual element magnetoresistive (MR) sensor comprises a central active region separating two passive end regions. The central region comprises a pair of MR elements separated by a high resistivity conductive spacer layer.

According to one embodiment, each passive region comprises (i) a hard bias layer which abuts a respective track edge of a first one of the MR elements and has a magnetization times thickness value at least equal to that of the one MR element for biasing the latter first MR element in one longitudinal direction; and (ii) a ferromagnetic bias layer which has a magnetization times thickness value at least equal to that of the second MR element for biasing, by exchange coupling, the second MR element substantially in an opposite longitudinal direction to achieve magnetic stabilization between the two MR elements.

The terms longitudinal direction and longitudinal bias, as used herein, are terms of art which are defined, for example, at page 1346 in the Proceedings of the IEEE, Vol. 81, No. 9, September 1993, pages 1344–1359 (copy attached). This publication clearly defines the term longitudinal as signifying parallel to the air bearing surface (ABS) of a magnetic recording medium, and traverse as perpendicular to the ABS.

Alternatively, the hard bias layer may be replaced by a ferromagnetic/antiferromagnetic first bilayer that abuts the MR element at each of its track edges and has a magnetization times thickness value matched to that of the first MR element to bias it, by exchange coupling, in said one longitudinal direction.

According to another embodiment, a dual element MR sensor comprises a central active region having (i) a pair of MR elements separated by a high resistivity conductive spacer layer, and (ii) an exchange bias layer in continuous underlying or overlying contact with one of the MR elements for biasing it, by exchange coupling, substantially in one longitudinal direction. Each passive end region comprises a hard bias layer abutting the other MR element and having a magnetization times thickness value at least equal to that of the other MR element for biasing it in an opposite longitudinal direction to achieve magnetic stabilization between the MR elements.

DETAILED DESCRIPTION OF THE INVENTION

Figure 1:
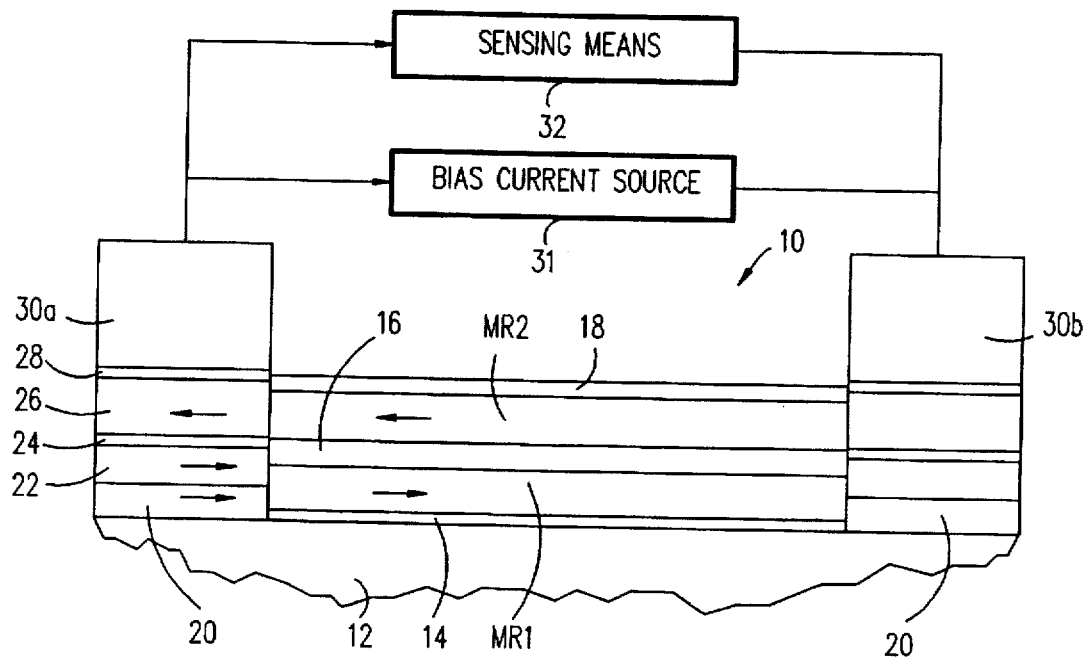
FIG. 1 is a schematic view of an MR sensing system showing an end view of one embodiment of an MR sensor embodying the invention, as viewed from the air bearing surface (ABS) of the MR sensor.

As illustrated in FIG. 1, a dual element magnetoresistive (MR) sensor 10 embodying the invention is deposited on an insulating substrate 12. Sensor 10 has a central active region 8 separating two passive end regions 4 and 6. Each central region 8 comprises the following layers deposited successively and defined by well-known ion-milling and photolithography process: a seed layer 14, a first MR element MR1 of a magnetically soft ferromagnetic material, a high-resistivity conductive nonmagnetic spacer layer 16, a second MR element MR2 of a magnetically soft ferromagnetic material, and a protective overcoat layer 18. Spacer layer 16 completely separates MR1 and MR2.

Thereafter, the passive end regions 4 and 6 are formed. Each passive end regions 4, 6 comprises a thin layer 20 of a magnetically soft ferromagnetic material substantially equal in thickness to that of MR1 deposited on substrate 12. Then, a layer 22 of antiferromagnetic material is deposited over and in contact with the ferromagnetic layer 20, followed by a thin layer 24 of a nonmagnetic metallic material. Next, a layer 26 of a hard magnetic bias material is deposited. The term "hard bias material" as herein used connotes a material, such as permanent magnet material, having high coercivity and high magnetization. Conductive leads 30a and 30b are then deposited over the hard bias layer 26. A layer 28 of suitable material is deposited between layer 26 and conductive leads 30a, 30b to reduce the resistance of the leads. The layers 20–30 are deposited so as to abut the MR elements MR1 and MR2 at the respective ends of the central active region 8 of the sensor 10. The length of the central active region 8 defines the track width of a data recording track formed on the surface of an associated magnetic storage media (not shown), the track edges being defined by the ends of the central active region 8.

According to a preferred embodiment of dual element MR sensor 10 for use in a disk file (not shown), substrate 12 comprises $Al_2O_3$; seed layer 14 is of Ta up to 40 Å thick; elements MR1 and MR2 are of NiFe from 50 Å to 300 Å thick; high-resistivity conductive spacer layer 16 is of beta-phase Ta from 60 Å to 1000 Å thick; protective overcoat layer 18 is of Ta from 20 Å to 40 Å; layer 20 is of NiFe from 50 Å to 300 Å thick; layer 22 is of NiMn or NiO from 300 Å to 600 Å thick; layer 24 is of Cr from 50 Å to 100 Å thick; layer 26 is of CoPtCr from 200 Å to 600 Å thick; layer 28 is of TiN about 100 Å thick; and conductive leads 30a, 30b are of Ta or other suitable electrically conductive material up to about 1000 Å thick.

According to features of the invention, Cr layer 24 not only serves as a seed layer for the CoPtCr layer 26 but also provides magnetic decoupling between the NiMn antiferromagnetic layer 22 and the CoPtCr layer. The antiferromagnetic layer 22 is exchange coupled to the NiFe layer 20 to provide a longitudinal bias field in MR element MR1 of a magnitude of the order of at least 20 Oersteds (Oe). The hard bias CoPtCr layer 26 preferably has a coercivity above 500 Oe. Similarly MR element MR2 is longitudinally biased by the hard bias CoPtCr layer 26. Since NiMn has a blocking temperature of about 400° C., the direction of the exchange coupled magnetic field is set during fabrication of sensor assembly 10 by annealing the NiFe/NiMn bilayer 20,22 at about 240° C. in a magnetic field oriented along the longitudinal axis of the MR element MR1 parallel to the sensor 10 air bearing surface (ABS) and to the surface of an adjacent magnetic storage media (not shown) as shown by arrow 33. The direction of magnetization of the hard bias CoPtCr layer 26 is set at room temperature after fabrication of sensor 10 by applying a large external magnetic field along the longitudinal axis of the MR element MR2 parallel to the sensor ABS. The direction of the longitudinal bias field and hence the orientation direction of the magnetization in MR elements MR1 and MR2 can be set antiparallel to each other by applying the external fields for the bilayer 20,22 in opposite directions along the axis of the MR elements MR1 and MR2 as shown by arrow 33 and 34, respectively. Antiparallel orientation is especially suitable for narrow track width applications.

Photolithography and ion milling techniques, known to those skilled in the art and forming no part of the present invention, are used to deposit the respective layers and to provide the above-described abutting junctions between the layers of the central active region 8 and passive end regions 4 and 6 and also to provide track edges which are as vertical as possible.

Note that the longitudinal magnetic field from bias layer 20 at the junction between layer 20 and MR1 and the stray magnetic field from hard bias layer 26 at the junction between layer 26 and MR2 are additive and provide magnetostatic coupling between the longitudinal bias fields in MR elements MR1 and MR2. This magnetostatic coupling helps stabilize the antiparallel magnetization orientation of MR1 and MR2. The magnetization times thickness value of the exchange bias NiFe layer 20 should be at least equal to that of the MR element MR1. The magnetization times thickness value of the hard bias CoPtCr layer 26 should be at least equal to that of the MR element MR2. Also, the electrical resistivity of the high resistivity conductive spacer layer 16 should be at least about 100 micro-ohm-cm to avoid excessive loss of sensor bias current due to shunting.

While a preferred embodiment has been described, it should be noted that spacer layer 16 may, if desired, be of Niobium nitride, Ta nitride, Ta oxide, Ti nitride, or NiCrO; but if these materials are used, they should be covered by a thin Ta seed layer to avoid degradation of the MR coefficient of MR element MR2. Also, hard magnetic layer 26 may, if preferred, be of other hard bias materials, such as CoCrTa or CoSm. Finally, the nonmagnetic metallic Cr thin layer 24 may, if preferred, be of a TiW or TaW alloy; and leads 30a,30b may, if preferred, be of TiW/Ta or Ta/Au/Ta.

It will thus be seen that the sensor 10 according to this embodiment desirably permits the orientation of the longitudinal bias field and hence the orientation of the magnetization of elements MR1 and MR2 to be set independently. For example, with an antiparallel magnetization orientation of elements MR1, MR2, the sensor is especially suitable for sensing in applications employing very narrow track widths, such as less than 1 micron.

A bias current source 31 and sensing means 32 are interposed in parallel between leads 30a,30b. Bias current source 31 provides a bias or sense current to each MR element MR1 and MR2. The voltage generated when the dual element head of sensor 10 senses an analog signal from a magnetic storage disk (not shown) will be sensed by sensing means 32. Note that, for this dual element sensor, only one electrical connection is required to each of the leads 30a,30b. Note, also, that the bias current in each MR element generates a magnetic field about the MR element which provides a transverse bias field in the other MR element which will be directed downwardly into the plane of the paper for MR1 and upwardly in the opposite direction from the plane of the paper for MR2. The bias current will split equally between the elements MR1 The transverse bias field is additive with the longitudinal bias field to set the sensor bias angle at magnitude in each MR element MR1 and MR2, respevtively and MR2, and the bias angle θ will be equal in both MR elements.

Figure 2:
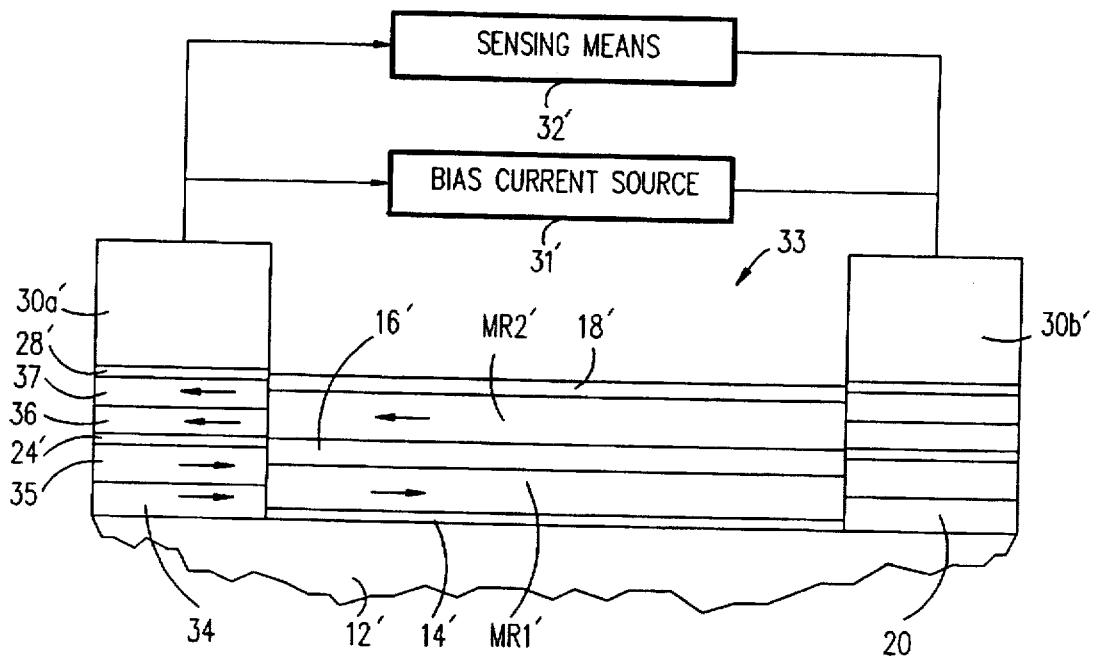
FIG. 2 is an end view of an embodiment of an MR sensor constituting a modification of that depicted in FIG. 1.

According to a variation of this embodiment and as shown in FIG. 2, dual element MR sensor 33 differs from sensor 10 only in that a bilayer 34,35 of NiFe/NiO replaces the NiFe/NiMn bilayer 20,22 and a bilayer 36,37 of NiFe/NiMn replaces the hard bias CoPtCr layer 26 of FIG. 1. Accordingly, the same reference numerals but primed are used in FIG. 2 to denote elements which may be identical with those of FIG. 1. Since NiMn and NiO have blocking temperatures of approximately 400° C. and 200° C., respectively, the NiMn layer 37 is annealed first at a temperature of about 240° C. to set its magnetic exchange bias direction to cause the direction of MR element MR2' to be similarly set; and thereafter the NiO layer 35 is annealed at a temperature of about 160° C. to set its magnetization direction and thereby that of MR element MR1' to be similarly set antiparallel to that of the NiMn layer 37. Also, with this variation, the Cr layer 24' decouples the NiFe/NiO layer 34,35 from the NiFe/NiMn bilayer 36,37; and the NiMn layer 37 of the bilayer 36,37 should be nearest the leads 30a', 30b' because it is conductive and will help establish connection of these leads to the MR element.

This configuration, which employs only exchange bias layers to achieve the antiparallel stabilization, is desirable for applications using very thin MR sensor elements (e.g., <100 Å) because it is difficult to obtain the desired coercivity with thin hard bias materials. However, unless intended for use with very thin MR elements, the embodiment first described is preferable because the configuration according to this variation requires annealing at two temperatures, rather than one.

Figure 3:
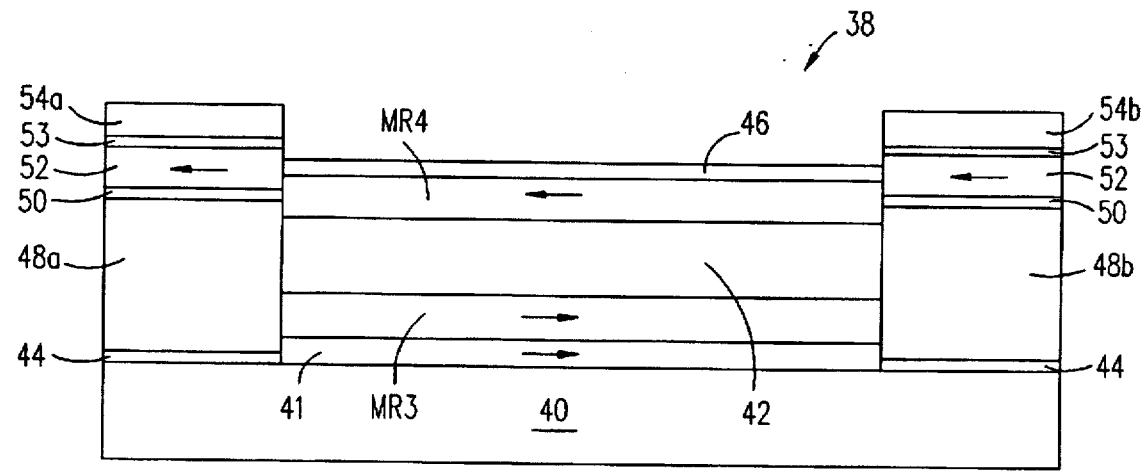
FIG. 3 is an end view of another embodiment of an MR sensor embodying the invention, as viewed from the air bearing surface (ABS) of the MR sensor.

As illustrated in FIG. 3, the dual element MR sensor 38 according to this embodiment comprises a substrate 40, preferably of $Al_2O_3$, on which are deposited in the central region 8 in successive layers by photolithography: an exchange bias layer 41 of antiferromagnetic material; an MR element MR3 of soft magnetic ferromagnetic material, a high-resistivity conductive nonmagnetic spacer layer 42, a second MR element MR4 of soft ferromagnetic material, and a protective overcoat layer 46. Spacer layer 42 magnetically isolates MR3 and MR4.

In the passive end regions 4 and 6 to either side of the MR layers just described are deposited on substrate 40 in successive layers: conductive lead layers 48a and 48b, a layer 44 between the substrate and conductive leads 48a,48b, to reduce the resistance of the leads; a seed layer 50; a layer 52 of a hard magnetic bias material; and conductive lead layers 54a and 54b a layer 53 between layer 52 and conductive leads 54a,54b to reduce the resistance of these leads.

Antiferromagnetic layer 41 preferably is of NiO or a NiO alloy between 200 Å and 400 Å thick. The thicknesses and compositions of the layers MR3, 42, MR4 and 46 in the central active region 8 of the MR sensor 38 are preferably the same as those for layers MR1, 16, MR2 and 18, respectively, of the embodiment of FIG. 1. Again, if the spacer layer 42 is other than Ta, a thin Ta seed layer (not shown) should be deposited on the spacer layer before deposition of layer MR4. Similarly, the thicknesses and compositions of layers 44 and 53 are preferably the same as those for layer 28, and of layers 50 and 52 the same as for layers 24 and 26, respectively; and the combined thickness as well as the composition for conductor leads 48 and 54 is the same as for leads 30 in the embodiment of FIG. 1. However, if preferred, alternative compositions may be substituted, such as those specified for the corresponding layers of the FIG. 1 embodiment.

According to features of the invention, MR element MR3 is exchange coupled with the NiO or NiO alloy layer 41 to provide an longitudinal bias field of the order of about 10 Oe. NiO is preferable over NiMn and FeMn because it is an insulator and hence does not shunt sensor bias current. If the exchange coupling between the NiO layer 41 and MR element MR3 is too strong, the NiO may be alloyed with another element such as Al to reduce the exchange coupled longitudinal field to a desired magnitude. Spacer layer 42 has a resistivity of at least 100 micro-ohm-cm. It acts as a gap, for the sensor the thickness of which determines the linear density of the data stored in data tracks on an associated magnetic media (not shown).

Figure 4:
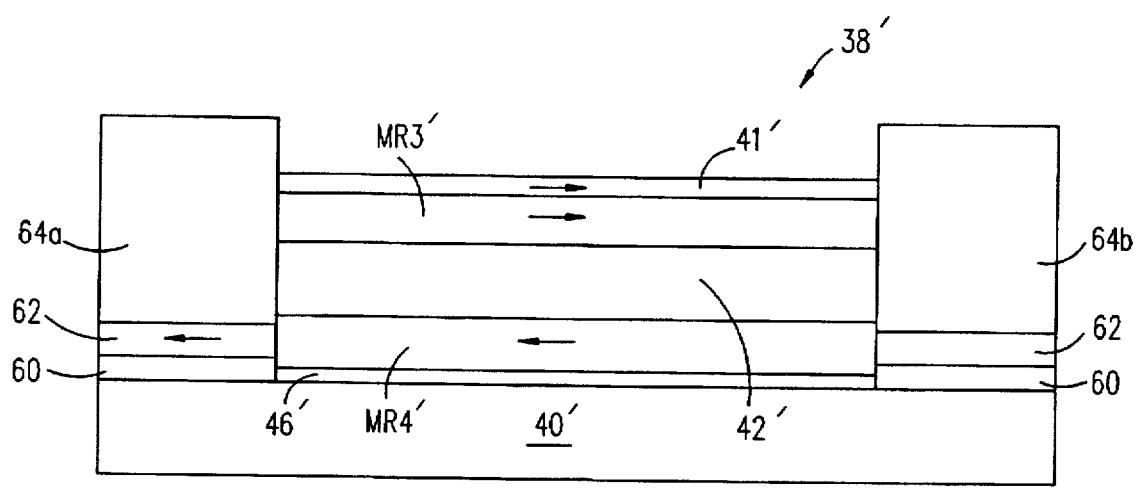
FIG. 4 is an end view of an embodiment of an MR sensor constituting a modification of that depicted in FIG. 3.

The embodiment of FIG. 4 differs from that of FIG. 3 in that the layers in the central active region 8 of the MR sensor 38' are deposited in reverse order on substrate 40' and hence are denoted by similar reference numerals but primed. The passive end regions 4 and 6 differ, however, from those in FIG. 3, in that they comprise the following layers successively deposited on the substrate 40': a seed layer 60, a hard magnetic bias layer 62 and conductor leads 64a,64b.

As in the embodiment of FIG. 1, the layer 60 is preferably of Cr. MR element MR3' is exchange coupled to the NiO or NiO alloy layer 41' to provide a longitudinal bias field of a magnitude of the order of 10 Oe. MR element MR4' is longitudinally biased by the hard bias layer 62. For the embodiments of FIGS. 3 and 4, the direction of the exchange coupled bias field is set during fabrication by annealing at 160° C. in a magnetic field applied along the longitudinal axis of the MR element parallel to the sensor ABS.

The embodiments of FIGS. 3 and 4 thus differ from that discussed in connection with FIG. 1 in that in FIGS. 3 and 4, one MR element (MR4 or MR4') is longitudinally biased by a hard bias layer, such as 52 or 62, respectively; and the other MR element (MR3 or MR3') is longitudinally biased by exchange coupling with an antiferromagnetic NiO or NiO alloy layer 41 or 41', respectively, that extends across the entire central active region of the sensor. Also, only the magnetization times thickness value of the hard bias layer 52 (FIG. 3) or 62 (FIG. 4) need be at least equal to that of MR element MR4 or MR4', respectively. However, as before, the directions of magnetization of MR3' and MR4' are made antiparallel.

In the embodiment of FIG. 3, the MR element MR4 desirably is encapsulated and protected by the protective overcoat layer 46 during further processing. In the embodiment of FIG. 4, since NiO is an insulator, the width of the NiO layer 41' desirably defines the track width independent of the alignment of the leads 54a,54b with the MR elements.

It should be noted that the configurations of the embodiments above described may be used with MR sensors that are shielded or unshielded. If the MR sensor is shielded, spacer layer 16, 16', 42 or 42' is relatively thin, whereas if the sensor is unshielded, the thickness of said layer is controlled by resolution requirements.

While the invention has been particularly shown and described with reference to preferred embodiments thereof, it will be understood by those skilled in the art that various changes in form and details may be made therein without departing from the spirit and scope of the invention.

Accordingly, the MR sensor configurations herein disclosed are to be considered merely as illustrative and the invention is to be limited only as specified in the claims.

We claim:

1. A dual element magnetoresistive sensor having a central active region separating passive end regions comprising:

first and second magnetoresistive elements separated by a nonmagnetic spacer layer of a material having a high electrical resistivity, said first and second magnetoresistive elements and said spacer layer extending over substantially only said central active region; and first and second longitudinal bias means for providing a longitudinal magnetic bias field in said first and second magnetoresistive elements, respectively, the longitudinal bias field in said first magnetoresistive element being oriented antiparallel to the longitudinal bias field in said second magnetoresistive element, said first and second longitudinal bias means extending over substantially only said passive end regions.

2. A dual element magnetoresistive sensor as in claim 1 wherein said first longitudinal bias means comprises an exchange coupled antiferromagnetic/ferromagnetic bilayer disposed in each of said passive end regions abutting the respective ends of said first magnetoresistive element for providing said longitudinal bias field in said first magnetoresistive element, and said second longitudinal bias means comprises a layer of hard magnetic material disposed in each of said passive end regions over said exchange coupled bilayer and abutting the respective ends of said second magnetoresistive element for providing said longitudinal bias field in said second magnetoresistive element, exchange coupled bilayer separated from said hard magnetic layer by a nonmagnetic decoupling layer.

3. A dual element magnetoresistive sensor as in claim 2 wherein said exchange coupled bilayer comprises a layer of NiMn deposited over and in contact with a layer of NiFe.

4. A dual element magnetoresistive sensor as in claim 2 wherein said hard magnetic layer comprises a layer of CoPtCr.

5. A dual element magnetoresistive sensor as in claim 1 wherein said first longitudinal bias means comprises a first exchange coupled antiferromagnetic/ferromagnetic bilayer disposed in each of said passive end regions abutting the respective ends of said first magnetoresistive element for providing said longitudinal bias field in said first magnetoresistive element, and said second longitudinal bias means comprises a second exchange coupled antiferromagnetic bilayer disposed in each of said passive end regions over said first exchange coupled bilayer and abutting the respective ends of said second magnetoresistive element for providing said longitudinal bias field in said second magnetoresistive element, said first exchange coupled bilayer separated from said second exchange coupled bilayer by a nonmagnetic decoupling layer.

6. A dual element magnetoresistive sensor as in claim 5 wherein said first exchange coupled bilayer comprises a layer of NiMn deposited over and in contact with a layer of NiFe and said second exchange coupled bilayer comprises a layer of NiO deposited over and in contact with a layer of NiFe.

7. A dual element magnetoresistive sensor as in claim 6 wherein said nonmagnetic decoupling layer comprises a layer of Cr.

8. A dual element magnetoresistive sensor as in claim 1 wherein said first longitudinal bias means comprises a bias layer of antiferromagnetic material disposed adjacent and in contact with a surface of one of said first or second magnetoresistive elements, said surface opposite said nonmagnetic spacer layer, said antiferromagnetic bias layer providing an exchange coupled magnetic bias field in said one magnetoresistive element.

9. A dual element magnetoresistive sensor as in claim 8 wherein said second longitudinal bias means comprises an antiferromagnetic/ferromagnetic exchange coupled bilayer disposed in each of said passive end regions abutting the respective ends of the other one of said first or second magnetoresistive elements for providing the longitudinal bias field in said other one of said first or second magnetoresistive elements.

10. A dual element magnetoresistive sensor as in claim 8 wherein said second longitudinal bias means comprises a hard magnetic layer disposed in each of said passive end regions abutting the respective ends of the other one of said first or second magnetoresistive elements for providing the longitudinal bias field in said other one of said first or second magnetoresistive elements.

11. A dual element magnetoresistive sensor as in claim 8 wherein said bias layer antiferromagnetic material is selected from the group consisting of MnFe, NiMn and NiO.

12. A dual element magnetoresistive sensor as in claim 9 wherein said exchange coupled bilayer comprises a layer of NiFe and a layer of antiferromagnetic material deposited over and in contact with said layer of NiFe, said antiferromagnetic material selected from the group consisting of MnFe, NiMn and NiO, said exchange coupled bilayer antiferromagnetic material being a different material than said antiferromagnetic bias layer material.

13. A dual element magnetoresistive sensor as in claim 10 wherein said hard magnetic material comprises CoPtCr.

14. A dual element magnetoresistive sensor as in claim 1 wherein each of said first and second magnetoresistive elements comprise a layer of NiFe and said nonmagnetic spacer layer comprises a layer of Ta.

* * * * *